Feb. 15, 1949. N. E. ANDERSON 2,461,798
AUTOMATIC ARC STARTER
Filed Aug. 6, 1947 5 Sheets-Sheet 2

INVENTOR
NELSON E. ANDERSON
BY
Pennie, Edmonds, Morton and Barrows
ATTORNEYS

Feb. 15, 1949.   N. E. ANDERSON   2,461,798
AUTOMATIC ARC STARTER
Filed Aug. 6, 1947   5 Sheets-Sheet 4

INVENTOR
NELSON E. ANDERSON
BY
Pennie, Edmonds, Morton and Barrows
ATTORNEYS

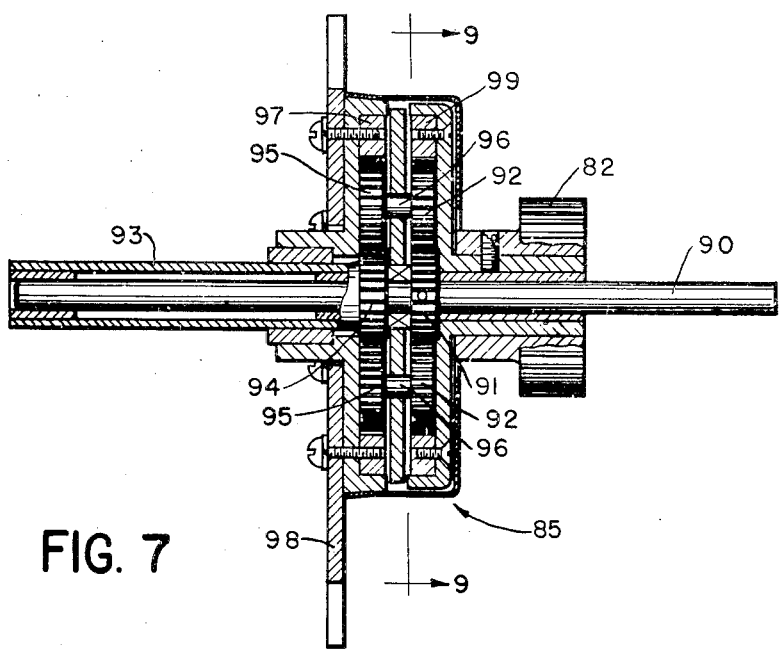
FIG. 7
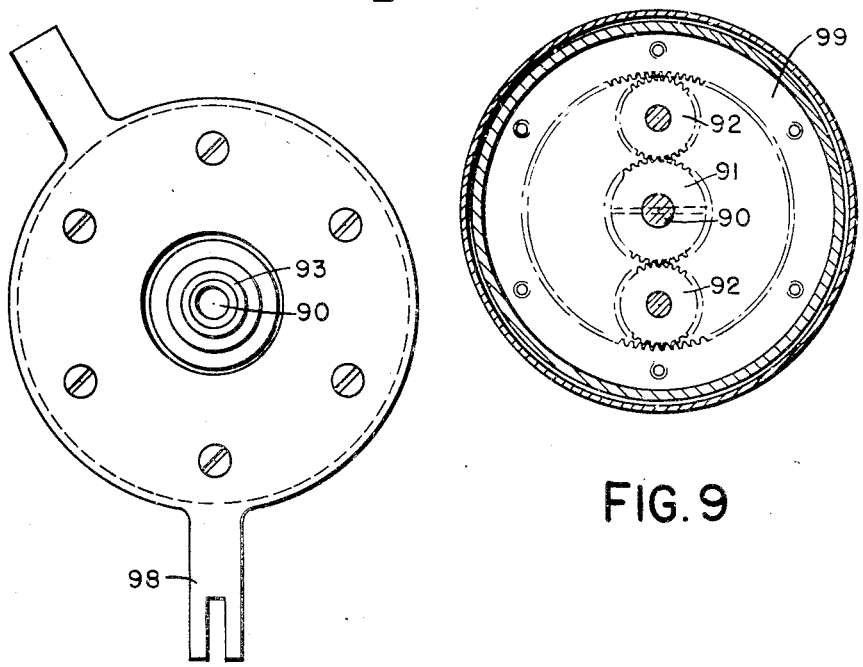
FIG. 8
FIG. 9

Patented Feb. 15, 1949

2,461,798

UNITED STATES PATENT OFFICE 2,461,798

AUTOMATIC ARC STARTER

Nelson E. Anderson, Scotch Plains, N. J., assignor to Air Reduction Company, Incorporated, New York, N. Y., a corporation of New York Application August 6, 1947, Serial No. 766,603

8 Claims. (Cl. 314—66)

This invention relates to arc welding apparatus and more particularly to arc welding apparatus including means for automatically starting the arc and for automatically restarting the arc whenever it is extinguished during the course of a welding operation.

As is well known in the electric arc welding art, the welding arc may be initiated by first moving the welding electrode into contact with the work piece to start current flow in the welding circuit and then quickly withdrawing the electrode until an arc of the desired length is established between the welding electrode and the work. Many systems have been devised for accomplishing this result in automatic welding machines but inherent defects in each have made them unsuitable for high quality welding under the variety of conditions encountered in modern welding techniques. For example, in the inert gas shielded arc welding art, a welding machine must be suitable for welding various metals of varying thicknesses on alternating current or direct current. For this type of service, the arc starter must function instantaneously and be energized independent of the welding current amplitude or voltage characteristics.

In automatic welding machines employing arc-starting mechanism it has been proposed heretofore to use the electrode feed motor for initiating the arc as well as for maintaining the proper arc length and it has also been proposed to employ arc starting means independent of the electrode feed motor. This latter method, in which the feed motor is relieved of the arc-starting duty, has several advantages. For example, any desired value of pull-up power may be used in such a system without in any way affecting the power or operation of the feed motor. Also if such independent arc-starting means are employed, it is possible to design the apparatus so that overtravel in the reverse direction is eliminated and so that any lost motion in the feeding mechanism has no effect on the starting of the arc. Furthermore, such an apparatus can be made quick acting so that if the arc is accidentally extinguished it can be reestablished instantly before the puddle has time to cool, thus eliminating the necessity of stopping the relative movement between the electrode and the work lengthwise of the line of the weld.

The present invention relates to automatic electric welding apparatus of the type having arc starting means energized independently of the electrode feed motor. It will be understood that the electrode feed motor herein referred to may be a motor for feeding a consuming electrode or a motor for maintaining the proper arc length only, where a non-consuming electrode is employed.

In general, a typical embodiment of my invention may be said to comprise an electrode holder having a tendency to move toward a work piece until the electrode touches the work piece, and arc-starting means connected to the electrode holder and adapted to move the holder away from the work piece and to support the holder in normal welding position, the arc-starting means being energized from a source independent of the electrical condition of the welding circuit and the arc-starting means being responsive to a change in the voltage between the electrode and the work piece from the open circuit value to a lesser value. A particular feature of this invention is the use of this change in the voltage between the electrode and the work piece from the open circuit value to a lesser value to control the supply of energy to the arc-starting means. Such apparatus is a distinct improvement over apparatus heretofore proposed employing an arc-starting solenoid in series with the welding arc.

In a system having an arc-starting solenoid in series with the welding arc, the arc-starting means can operate only on a narrow range of welding currents and accordingly such apparatus is not sufficiently flexible for the varieties of welding conditions frequently encountered in modern welding practice. Apparatus embodying the present invention, however, works equally well whether a low current weld or a high current weld is made. In inert gas shielded arc welding technique the low welding currents used are insufficient to actuate a series arc-starting solenoid.

Another advantage of this invention over the series type is its quick action since the welding current build-up time is eliminated from the arc-starting operation. Furthermore in alternating current welding, sufficient current flows in the welding circuit under certain conditions to actuate a series solenoid without establishing an arc. This is possible if the current is passing through zero when the electrode is withdrawn. The present invention avoids this false starting difficulty on alternating current by instantly repeating the starting motion until an arc is established.

Another feature of this invention involves the use of mechanism for superimposing the arc-starting motion produced by an arc-starting solenoid, on the electrode positioning motion. For a non-depositing electrode, the electrode positioning motor may be a reversible motor that maintains the arc length constant over the surface irregularities on the work, or, in the case of a consuming electrode, it may be a uni-directional feed motor that feeds the electrode toward the work at a rate equal to the electrode burn-off rate.

In apparatus embodying the present invention, wherein the electrode holder has a tendency to move toward a work piece until the electrode touches the same, this biasing tendency may be effected by gravity or by a spring or other means, regardless of whether the apparatus includes automatic electrode feeding mechanism or manual feed.

Where an electrode feed motor or the like is employed, a feature of this invention is the use of differential mechanism interconnecting the electrode holder, the arc-starting means and the electrode feed motor which adjusts the welding position of the electrode holder to maintain the desired arc length during normal welding. Various types of electrode feed motor apparatus may be employed as desired, but for very sensitive response, I prefer to employ a pair of motors each responsive to variations in arc voltage during a welding operation to adjust the position of the electrode with respect to the work. In such a system I prefer to employ compound differential mechanism interconnecting these motors, the electrode holder and the arc starting mechanism.

The various features and advantages of this invention will be more apparent upon considering the following detailed description of typical embodiments of the invention illustrated in the accompanying drawings in which:

Fig. 7 is a longitudinal section view of a double differential mechanism forming part of the apparatus illustrated in Fig. 4;

Fig. 8 is an end elevation of the differential mechanism illustrated in Fig. 7; and Fig. 9 is a transverse section view of the differential mechanism of Fig. 7 taken on line 9—9 of Fig. 7.

Figure 1:
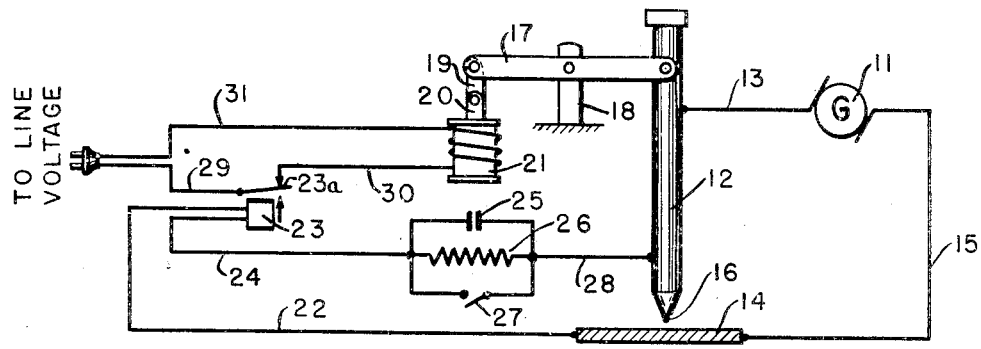
Fig. 1 is a simplified schematic drawing of an arc welding apparatus embodying the invention.

Referring to Fig. 1, an arc welding generator 11 is shown connected to an electrode holder 12 by a conductor 13. The other side of the generator is electrically connected to a work piece 14 by a conductor 15. The welding circuit is then completed by a welding arc between an electrode 16 held by the electrode holder 12 and the work piece 14. Pivotally connected to the electrode holder 12 is a non-conducting arm 17 pivoted on a fixed support 18. The other end of the arm 17 is pivotally connected to a link 19 which in turn is connected to an armature 20 on a solenoid 21. The fixed support 18 is so positioned that the electrode holder overbalances the solenoid armature when the solenoid is deenergized, allowing electrode 16 to rest on the work. The end of the holder thus has a tendency to move toward the work piece until the electrode touches the work piece. In other words, whenever the solenoid 21 is deenergized, the weight of the electrode holder is sufficient to cause the electrode holder to move downward until the electrode touches the work.

In parallel with the welding arc there is a relay circuit comprising a conductor 22, a relay 23, a conductor 24, a conductor 28 and a parallel combination including a capacitor 25, a resistor 26 and a switch 27. The relay 23 has its contacts 23a in series with the solenoid 21 making a circuit, when relay 23 is deenergized, from one side of an independent voltage source through a conductor 29, relay contact 23a, conductor 30, solenoid 21 and conductor 31 to the other side of the independent voltage source.

The operation of the apparatus diagrammatically illustrated in Fig. 1 may be described as follows:

Starting with all circuits deenergized, the electrode 16 rests on the work piece 14. When the line voltage is applied to the solenoid circuit, current flows in the solenoid winding attracting the armature 20. This energizes the solenoid to operate the lever arm 17 to raise the electrode holder 12 and hence the electrode 16 until the electrode is spaced from the work a distance equal to the optimum arc length when the solenoid armature has completed its stroke. If the welding generator 11 is now started, almost full open circuit voltage will exist between the electrode 16 and the work piece 14. Under these conditions such current flows through the resistor 26 and relay 23 to energize this relay. Relay 23 operates to open its contact 23a, thus deenergizing the solenoid 21 which allows the electrode holder 12 to drop until the electrode 16 touches the work piece 14. This short circuits the welding circuit and the voltage between the electrode 16 and work piece 14 drops to zero, causing the relay 23 to be deenergized as the resistance of the relay circuit is high.

Relay contact 23a then closes to energize the solenoid 21 which operates to raise the electrode 16 from the work 14 to establish the welding arc. As long as the arc is maintained the voltage difference between the electrode 16 and the work piece 14 is not great enough to cause sufficient current through the relay 23 to energize it. Should the arc be interrupted for any reason, the welding voltage immediately approaches the generator open circuit voltage value, and the cycle is reinitiated, redrawing the arc. The capacitor 25 serves to accelerate the response of relay 23 when on D. C. operation, providing a countervoltage to that produced by the flux decay in the solenoid when short circuited by the arc.

The arc starter as illustrated in Fig. 1 is equally well adapted for use in alternating current welding. Under these conditions switch 27 is closed to provide the higher voltage required for operation of the relay 23 on alternating current.

Figure 2:
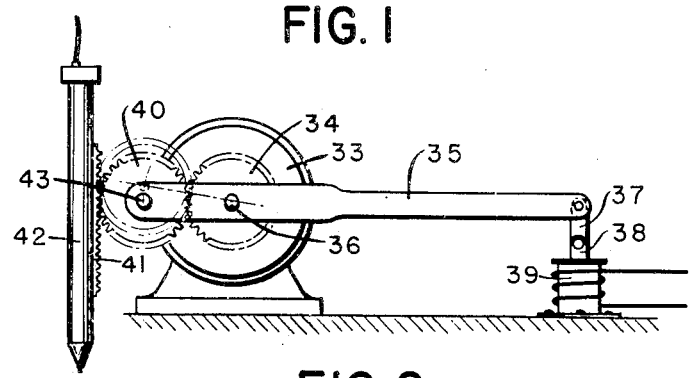
Fig. 2 is a diagrammatic illustration of a mechanical arrangement for combining the arc-starting movement with the electrode feed or positioning motion.

In Fig. 2 I have illustrated in schematic form apparatus for combining the movement of the arc-starting mechanism with the motion of an electrode feed motor which automatically adjusts the position of the electrode with respect to the work. It will be understood, however, that my improved arc starting mechanism can be employed in a semi-automatic welding machine having manual electrode feed for feeding the electrode toward the work prior to the initiation of the arc.

In Fig. 2 an electrode feed motor 33 drives a spur gear 34 preferably through reduction gears. The feed motor may be responsive to arc voltage as a means for maintaining electrode spacing constant. Apparatus for this purpose is well known in the art and accordingly it is not deemed necessary to illustrate the control circuit for the motor 33. An arm 35 is pivoted at 36 on the shaft of the spur gear 34. One end of the arm 35 is attached by a link 37 to the armature 38 of a solenoid 39. The other end of the arm 35 supports the idler spur gear 40 so positioned as to engage the spur gear 34 and a rack 41 which is mechanically attached to an electrode holder 42. The rack 41 is electrically insulated from the electrode holder 42. Rotation of the feed motor 33 causes rotation of the spur gear 34 which turns the idler gear 40 about its axis 43 to advance or retract the rack and attached electrode holder according to the direction of rotation.

The arc-starting solenoid 39 corresponds with the solenoid 21 in Fig. 1 and imparts substantially vertical movement to the adjacent end of the arm 35. This arm pivots about the point 36 so that any motion of the solenoid armature 38 results in a proportional movement of the axis 43 about the pivot pin 36. This causes the gear 40 to roll in planetary fashion about the gear 34. The gear 40 is engaged with the rack 41 and the rotation and translation of the gear 40 imparts motion to the electrode holder 42 in accordance with the motion of the solenoid armature 38. Since this latter motion is for arc-starting purposes only, the stroke of the solenoid armature need not be long and the angular rotation of the arm 35 about the pivot 36 will consequently be small. This precludes any possibility of disengagement of the idler gear 40 and the rack 41. It will be understood that whenever the solenoid 39 is deenergized, the weight of the electrode holder 42 and the idler gear 40 associated therewith is sufficient to cause the electrode holder to drop by gravity until the electrode touches the work. At this instant the solenoid 39, which as stated above corresponds with the solenoid 21 in Fig. 1, is energized to draw the arm 35 downward and lift the electrode holder 42 from the work, thus starting the arc. After the arc is started the electrode holder is maintained in the desired normal operating position by the automatic action of the feed motor 33.

Figure 3:
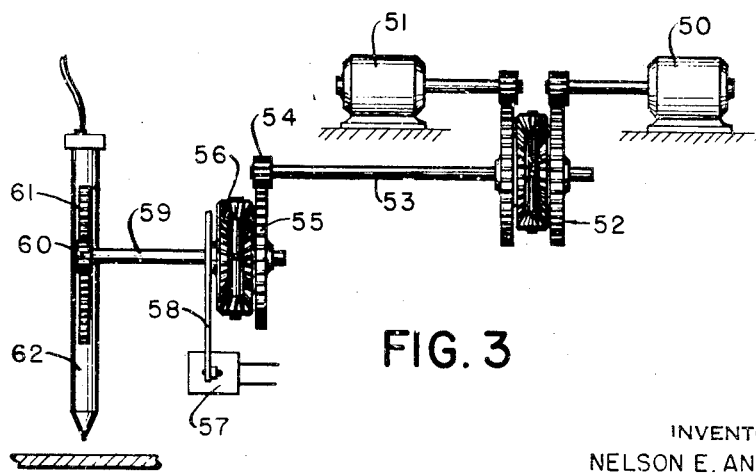
Fig. 3 is a diagrammatic illustration of an alternative mechanical arrangement for combining the arc-starting movement with the electrode feeding or positioning motion.

Another reversible system for use with the arc-starting mechanism is illustrated in Fig. 3 wherein motor 50 is connected in parallel with the welding arc so that its speed reflects the arc voltage, running faster when the arc is long and slower when the arc is short. A second motor 51 is independently energized and governed to maintain constant speed in the direction opposite to the direction of rotation of motor 50. Both motors are connected to differential mechanism 52 having an output shaft 53, the speed and direction of rotation of which represents the difference in speed of the constant speed motor 51 and the arc voltage motor 50. If the welding arc is too long, the arc voltage is above normal and causes the motor 50 to run faster than the motor 51, thus producing a net rotation of the shaft 53 equal to one-half the difference in speeds of the two differential spur gears driven by the motors. This rotation of shaft 53 is utilized to move the electrode holder 62 toward the work to establish the optimum arc length. Similarly if the welding arc is too short, the arc voltage is such that the motor 50 runs slower than the motor 51 to produce a rotation of the shaft 53 in the opposite direction to increase the length of the arc to the optimum value.

A spur gear 54 attached to the shaft 53 engages a spur gear 55 which is one input to another differential 56. A solenoid 57 (corresponding with the solenoid 21 of Fig. 1) has its armature attached to an arm 58 which is connected to a beveled gear of the differential 56. This constitutes the second input to this differential. The output of this differential 56 is through a shaft 59 which transmits the electrode position regulating motion produced by the action of motors 50 and 51, as well as the superimposed motion of the arc-starting mechanism including the solenoid 57 and its actuating arm 58 connected to one of the gears of the differential 56. The shaft 59 carries a pinion 60 engaging a rack 61 on the electrode holder 62.

In the apparatus as illustrated in Fig. 3 it has been explained that the motor 51 is a constant speed motor independently energized and that the motor 50 is responsive to arc voltage. It will be understood, however, that if desired, both motors 50 and 51 may each be responsive to arc voltage, the control being such that as one motor accelerates, the other decelerates. This increases the sensitivity of the system.

Figure 4:
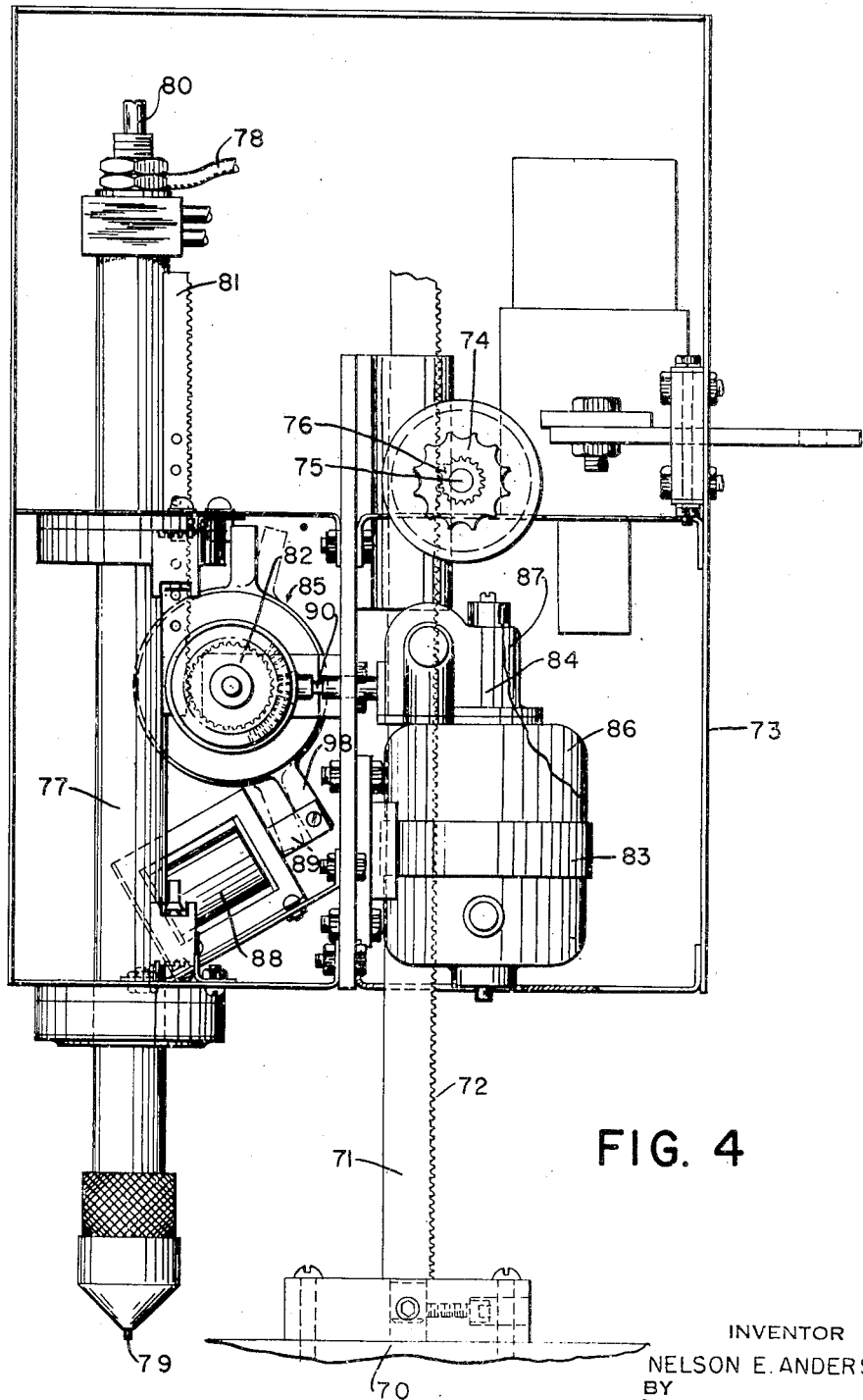
Fig. 4 is a side elevation of an arc welding apparatus embodying the invention and including an inert gas shielded electrode.
Figure 5:
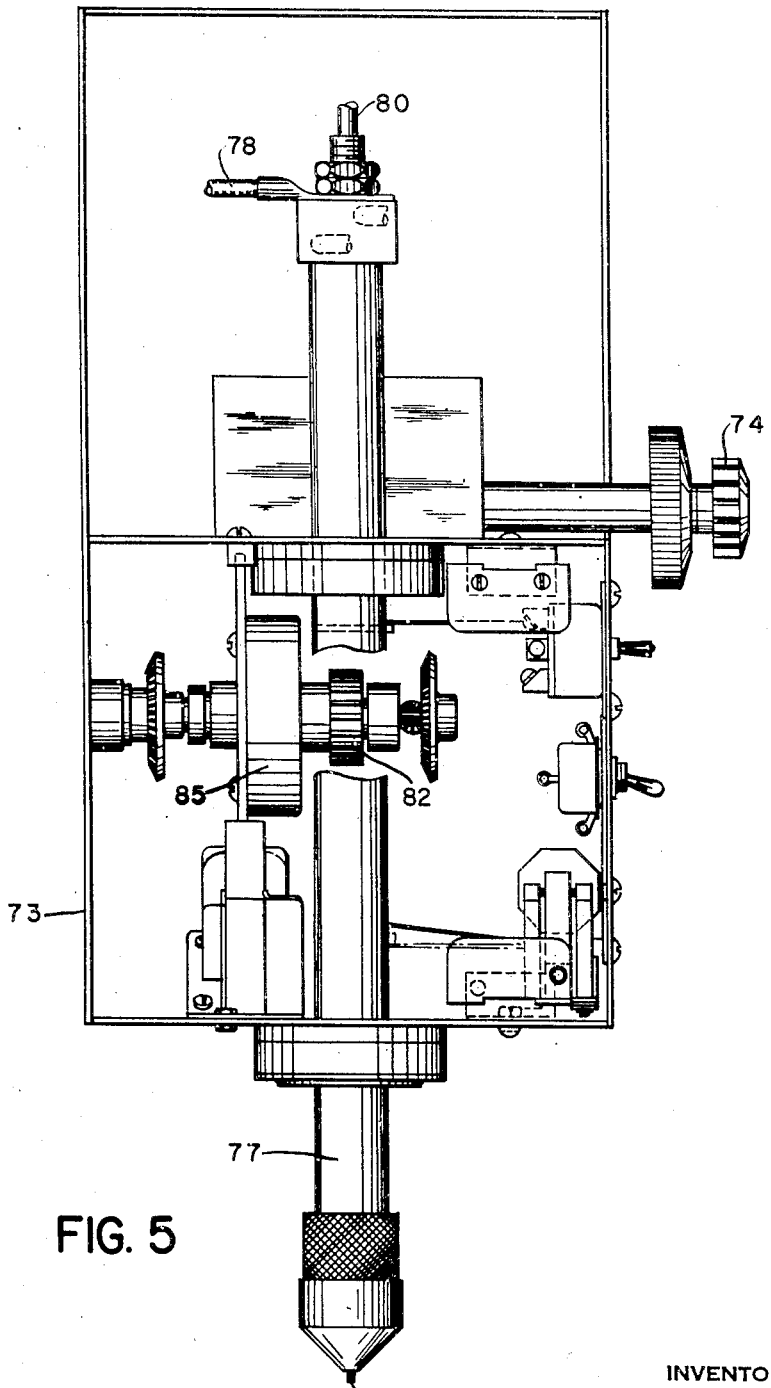
Fig. 5 is a front elevation of the apparatus illustrated in Fig. 4.
Figure 6:
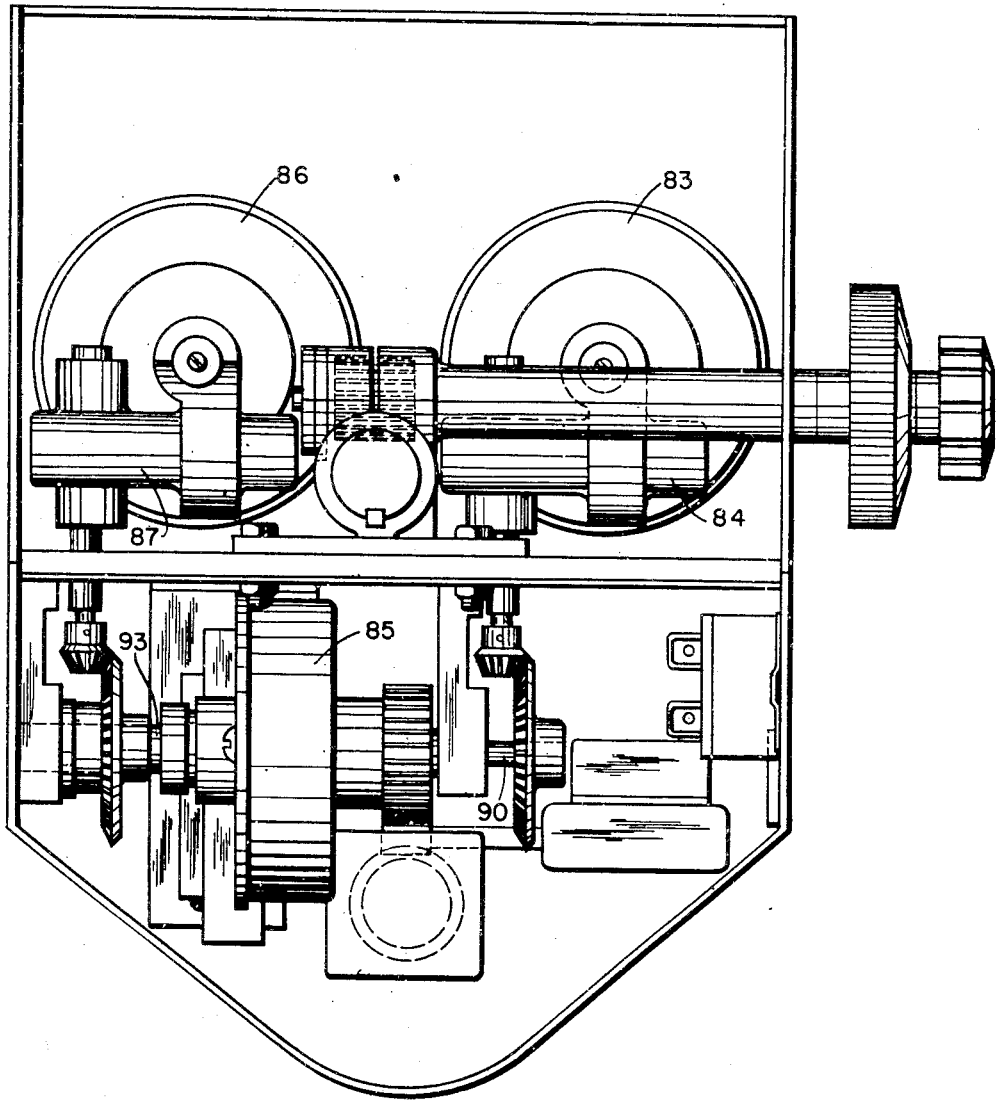
Fig. 6 is a top plan view of the apparatus illustrated in Fig. 4.

Figs. 4, 5, and 6 illustrate inert gas shielded arc welding machines incorporating the arc-starting mechanism of Fig. 1 and the mechanical elements of Fig. 3 for combining the arc-starting and electrode feed motion. A base 70 supports a post 71, part of which constitutes a rack 72. A chassis or frame 73 is mounted to ride up and down on the post 71 when a hand wheel 74 is turned. An axle 75 to which the hand wheel 74 is attached, is rotatably mounted with bearings in the frame 73. A pinion 76 is attached to the axle 75 and engages the rack 72 on the post 71.

An electrode holder 77 is movably supported in the frame 73. The electrode holder 77 comprises a tubular member to one end of which a welding cable 78 is attached and in the other end of which an electrode 79 is held by a chuck. An inert gas is fed into the electrode holder through a fitting 80 and is discharged around the electrode to form an inert gas shield during welding. A rack 81 is attached to the electrode holder to engage a pinion 82 so it may be moved toward and away from the work. A variable speed motor 83 whose speed is controlled by the arc voltage is mounted in the frame 73 and works through reduction gears enclosed in a housing 84 and into a double differential 85. Another motor 86 whose speed response is opposed to that of motor 83 operates on arc voltage and works into the double differential 85 through reduction gears enclosed in a housing 87. A solenoid 88 has an armature 89 which provides the third mechanical input to the double differential 85. It should be noted that the motor 83, the motor 86, and the solenoid 88 correspond to the motor 51, the motor 50, and the solenoid 57 respectively, as shown on the mechanical diagram of Fig. 3. The double or compound differential corresponds to the two single differentials 52 and 56 in Fig. 3.

Figures 7, 8 and 9 show in detail the construction of the double differential 85. One motor drives shaft 90 which turns a spur gear 91 in the differential housing. This spur gear 91 engages a pair of diametrically opposed spur gears 92 forming part of an idler spider. The other motor drives a tubular shaft 93 to which the spur gear 94 is attached. The spur gear 94 engages another pair of diametically opposed spur gears 95 also forming part of the same idler spider. Spur gears 92 and 95 are mounted on a common shaft 96, but each is free to turn on that shaft. Idler gears 95 engage an internal gear 97 to which an arm 98 is fastened. The input of the armature of the arc starting solenoid to the differential is through this arm 98. Another internal gear 99 engages the idlers 92 and is secured to the output pinion 82 which meshes with the rack 81 on the electrode holder 77. With arm 98 held stationary and shafts 90 and 93 being driven, the pinion 82 will turn with its speed and direction proportional to the difference in speed of the shafts 90 and 93. Furthermore any motion of the arm 98 will superimpose a proportional motion on the pinion 82. This differential merely combines the mechanical motions the same way as the two simple differentials of Fig. 3 and is not intended, to be part of this invention, but merely suitable apparatus for carrying it out.

It will be understood that by using additional contacts on relay 23 (Fig. 1) the apparatus of this invention can, in addition to starting the arc, be adapted to automatically start and stop the relative motion of the work and electrode. It also may be used to turn the inert shielding gas on and off by means of a solenoid valve thereby effecting an economy of the gas when the arc is extinguished.

It will be understood that in the typical embodiments of my invention illustrated diagrammatically in the accompanying drawings, the movable electrode holder has a tendency to move toward the work piece until the electrode touches the work piece. An arc-starting mechanism is provided with means responsive to a change in the voltage between the electrode and the work piece from the open circuit value to a value less than the open circuit value, to energize the arc-starting mechanism to withdraw the electrode from the work to start the arc. The apparatus is of such a nature that the movement of the electrode holder in response to the operation of this starting mechanism may be superimposed on the motion produced by one or more electrode feed motors which serve to adjust the position of the electrode during the welding operation.

It will be understood that the invention is not limited to the specific embodiments thereof illustrated in the accompanying drawings and discussed in detail but includes such modifications thereof as fall within the scope of the appended claims.

I claim:

1. Arc welding apparatus comprising a welding electrode, a movable electrode holder having a tendency to move toward a workpiece until the electrode touches the same, energizable arc-starting means for moving said holder away from the workpiece and supporting the holder in welding position, a welding circuit connected to the electrode and the workpiece, a source of energy for said arc-starting means independent of the electrical condition of the welding circuit, and means responsive to a change in the voltage between the electrode and the workpiece from the open circuit value to a value less than the open circuit value for connecting said source to said arc-starting means.

2. Arc welding apparatus according to claim 1 characterized by the voltage responsive means comprising a relay having its operating coil connected in shunt relation to the electrode and the work at all times.

3. Arc welding apparatus comprising a welding electrode, a movable electrode holder having a tendency to move toward a workpiece until the electrode touches the same, energizable arc-starting means for moving said holder away from the workpiece and supporting the holder in welding position, a welding circuit connected to the electrode and the workpiece, a source of energy for said arc-starting means independent of the electrical condition of the welding circuit, and means responsive to a change in the voltage between the electrode and the workpiece from the open circuit value to a value less than the open circuit value for connecting said source to said arc-starting means and responsive to a change in the voltage between the electrode and the workpiece from a value less than the open circuit value to the open circuit value, for interrupting the supply of energy from said source to said arc-starting means.

4. Arc welding apparatus comprising a welding electrode, a movable electrode holder having a tendency to move toward a workpiece until the electrode touches the same, energizable arc-starting means for moving said holder away from the workpiece and supporting the holder in welding position, a welding circuit connected to the electrode and the workpiece, a source of energy for said arc-starting means independent of the electrical condition of the welding circuit, means responsive to a change in the voltage between the electrode and the workpiece from the open circuit value to a value less than the open circuit value, for connecting said source to said arc-starting means, and adjusting means responsive to variations in arc voltage during a welding operation to adjust the welding position of the electrode holder.

5. Arc welding apparatus comprising a welding electrode, a movable electrode holder having a tendency to move toward a workpiece until the electrode touches the same, energizable arc-starting means for moving said holder away from the workpiece and supporting the holder in welding position, a welding circuit connected to the electrode and the workpiece, a source of energy for said arc-starting means independent of the electrical condition of the welding circuit, means responsive to a change in the voltage between the electrode and the workpiece from the open circuit value to a value less than the open circuit value, for connecting said source to said arc-starting means, and adjusting means responsive to variation in arc voltage during a welding operation to adjust the welding position of the electrode holder, said electrode holder being connected to the arc-starting means and to said adjusting means by differential mechanism.

6. Arc welding apparatus comprising a welding electrode, a movable electrode holder having a tendency to move toward a workpiece until the electrode touches the same, energizable arc-starting means for moving said holder away from the workpiece and supporting the holder in welding position, a welding circuit connected to the electrode and the workpiece, a source of energy for said arc-starting means independent of the electrical condition of the welding circuit, and means responsive to a change in the voltage between the electrode and the workpiece from the open circuit value to a value less than the open circuit value for connecting said source to said arc-starting means, the said arc-starting means comprising an electromagnetic device energized by said source and said voltage responsive means comprising a relay having its operating coil connected in shunt relation to the electrode and the work.

7. Arc welding apparatus comprising a welding electrode, a movable electrode holder having a tendency to move toward a workpiece until the electrode touches the same, energizable arc-starting means for moving said holder away from the workpiece and supporting the holder in welding position, a welding circuit connected to the electrode and the workpiece, a source of energy for said arc-starting means independent of the electrical condition of the welding circuit, means responsive to a change in the voltage between the electrode and the workpiece from the open circuit value to a value less than the open circuit value, for connecting said source to said arc-starting means, and adjusting means responsive to variations in arc voltage during a welding operation to adjust the welding position of the electrode holder, said adjusting means comprising a motor responsive to variations in arc voltage during a welding operation, and differential means connecting the electrode holder with the arc-starting means and the said adjusting means.

8. Arc welding apparatus comprising a welding electrode, a movable electrode holder having a tendency to move toward a workpiece until the electrode touches the same, energizable arc-starting means for moving said holder away from the workpiece and supporting the holder in welding position, a welding circuit connected to the electrode and the workpiece, a source of energy for said arc-starting means independent of the electrical condition of the welding circuit, means responsive to a change in the voltage between the electrode and the workpiece from the open circuit value to a value less than the open circuit value, for connecting said source to said arc-starting means, and adjusting means responsive to variations in arc voltage during a welding operation to adjust the welding position of the electrode holder, said adjusting means comprising a pair of motors each responsive to variations in arc voltage during a welding operation, and compound differential mechanism interconnecting the said motors, the electrode holder and said arc-starting means.

NELSON E. ANDERSON.

REFERENCES CITED

The following references are of record in the file of this patent:

UNITED STATES PATENTS

| Number | Name | Date |
|---|---|---|
| 1,991,128 | Tripp | Feb. 12, 1935 |